J. C. BIRDSELL.
Machine for Thrashing, Hulling, and Cleaning Clover-Seed.
No. 8,638. Reissued Mar. 25, 1879.
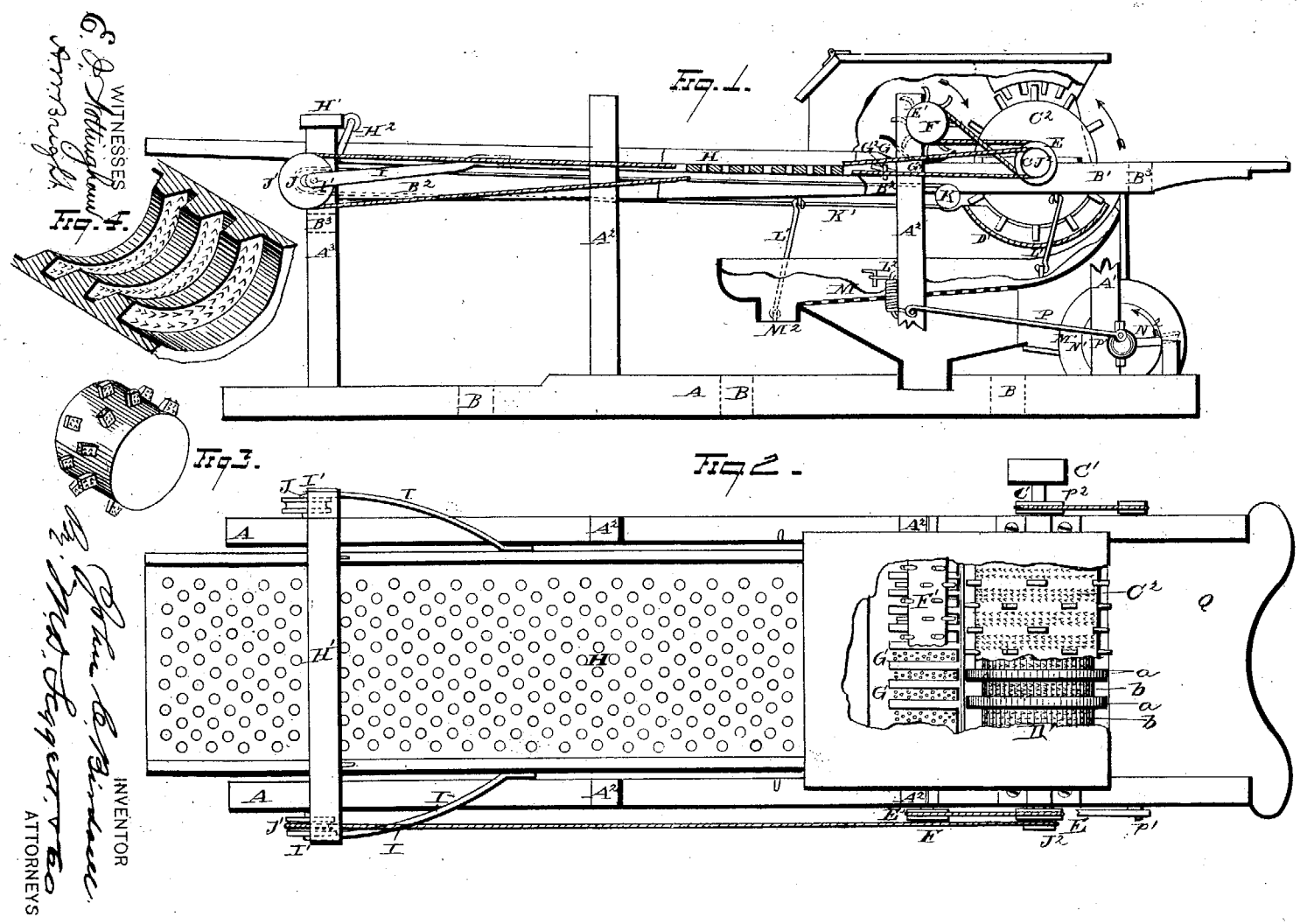
WITNESSES
E. F. Nottingham
A. M. Bright
INVENTOR
John C. Birdsell
By M. D. Leggett & Co
ATTORNEYS
THE NORRIS PETERS CO., PHOTO-LITHO., WASHINGTON, D. C.

UNITED STATES PATENT OFFICE.

JOHN C. BIRDSELL, OF SOUTH BEND, INDIANA.

IMPROVEMENT IN MACHINES FOR THRASHING, HULLING, AND CLEANING CLOVER-SEED.

Specification forming part of Letters Patent No. 37,488, dated January 27, 1863; Reissue No. 8,638, dated March 25, 1879; application filed December 12, 1878.

*To all whom it may concern:*

Be it known that I, JOHN C. BIRDSELL, formerly of West Henrietta, New York, but now of South Bend, county of St. Joseph, and State of Indiana, have invented a new and useful Machine for Thrashing, Hulling, and Cleaning Clover-Seed; and I do hereby declare that the same is described and represented in the following specification and drawings.

Figure 1 is an elevation of one side of my improved machine for thrashing, hulling, and cleaning seed. Fig. 2 is a plan or top view of the same. Fig. 3 is a detached view of one form of toothed thrashing-cylinder, in which the cylindrical surfaces are smooth and provided with roughened teeth. Fig. 4 is a view, partially in section, of one form of hulling-concave.

My invention consists, first, in the combination, with the thrashing-cylinder of a seed-separating machine, of appliances operating in connection with the teeth of the said thrashing-cylinder to detach clover-heads from their stems, and appliances operating in connection with the same cylinder to hull or detach the clover-seeds from the small pods containing them, whereby clover-heads may be thrashed or detached from their stems and the seeds hulled or separated from the pods in one operation with one and the same thrashing-cylinder; secondly, in the combination, with the thrashing-cylinder of a seed-separating machine, of appliances supported adjacent to the said thrashing-cylinder and projecting between its teeth, the teeth of the thrashing-cylinder adapted to have a relative motion across the said appliances, whereby by their joint action clover-heads may be thrashed or detached from their stems, and, in connection with and adjacent to the same cylinder, hulling appliances, which are adapted to co-operate with the said cylinder and its teeth, and effect the separation of the clover-seeds from the small pods containing them; thirdly, in the combination, with the thrashing-cylinder of a seed-separating machine, of a surface provided with teeth, adapted, in connection with the thrashing-cylinder, to thrash or detach clover-heads from their stems, and another surface provided with hulling appliances adjacent to the same cylinder, and adapted, in connection therewith, to hull or detach clover-seeds from the small pods containing them, whereby, in substantially a single machine and with one and the same cylinder, clover-heads may be thrashed or detached from their stems and the seeds hulled from their pods all at one operation and at one hulling; fourthly, in a rotating thrashing and hulling cylinder with a thrashing concave or arch above and a hulling concave or arch below, adapted to thrash the seeds from the straw and stalks and hull it at one operation; fifthly, as a means for operating the bolt, the combination with it of a crank-shaft located at the rear of the machine, said crank-shaft at the same time caused to carry an apron; sixthly, in the combination, with a thrashing-cylinder adapted to take in and operate upon clover on the straw, of thrashing and hulling devices located opposite said cylinder, and operating in connection therewith, whereby clover may be taken on the straw, the heads thrashed therefrom, and the seed hulled out, all at one operation and with one cylinder.

A $A^1$ $A^2$ B $B^1$ $B^2$, &c., is a suitable frame-work for supporting the machinery. C is the drive-shaft, operated by suitable pulley $C^1$, driven by any convenient power. $C^2$ is the thrashing-cylinder, provided with teeth about one and one-half inch long, and at a suitable distance apart lengthwise of the cylinder; and I prefer that the teeth of one row shall stand opposite the spaces in the adjacent row. In the device shown the rows of teeth are about seven inches apart. This thrashing-cylinder is provided with a concave or arch, D, which has several rows of teeth, arranged to break spaces in the different rows. A portion of these teeth I prefer to make wedge-shaped, and they are all so arranged as to project between the teeth on the cylinder and obstruct the passage of the clover-hay, so that in operation the teeth of the cylinder shall, relatively with the teeth of the concave, have a motion across the latter, to the end that, the clover-hay being detained in its course by the said obstructions projecting between the cylinder-teeth, the heads will, by the rapidly-moving thrashing-teeth, be stripped off over the said obstructions or detached from their stems.

The thrashing-cylinder may be (as shown in Fig. 3) made plain and with either smooth or roughened teeth; or the surface of the cylinder between the teeth may, if desired, be made roughened or in the nature of a rasp, to facilitate the hulling of the clover-seeds from the small pods containing them. In connection with the same thrashing-cylinder $C^2$ is an arch or concave, D′, the surface of which is adapted, in connection with said thrashing-cylinder, to hull or separate the clover-seeds from their pods. The hulling-concave shown in the drawings is provided with projecting ribs, which are adapted to extend in between the teeth upon the cylinder, and preferably project nearly to its surface, while the cylinder-teeth are preferably made to extend so as nearly to touch the surface of the concave in passing.

I prefer generally that the distance between the ends of the cylinder-teeth and the surface of the concave, and the distance between the outer ends of the concave ribs or projections and the surface of the cylinder, should be about one-eighth of an inch, in order that a hulling action may more effectually result at those points.

The sides and tops of the ribs of the concave may be smooth, and the bottoms of the throats only roughened, as shown in Figs. 1 and 2; or the sides, bottom, and top of the ribs may all be roughened, as shown in Fig. 4. The ribs are shown at *a a*, and the grooves between them, through which the teeth of the cylinder pass, at *b b*.

The particular location, with respect to the cylinder, of the detaching or thrashing and the hulling devices is immaterial, so that both said appliances are placed opposite the surface of the cylinder, so as to mesh or co-operate directly with the cylinder and its teeth; and any arrangement of said thrashing and hulling appliances will suffice if they are so arranged as to both operate upon the clover before it leaves the machine to detach or thrash the heads from the stems and separate the seeds from the small pods containing them, for I regard as one of the most valuable features of my invention a construction whereby with one operation in one machine with a single cylinder, and that a thrashing-cylinder, clover may be taken on the straw and the heads be detached therefrom and the seed hulled out from the small pods; for to effect this the relation of the parts must be such as to take in and dispose of the bulky straw. And before my invention I do not know that any single-cylinder machine had ever been made which could thus take clover on the straw, which same cylinder could simultaneously act to get out the seed; and I would have it understood that my invention contemplates, broadly, such a construction and adaptation of the parts as to effect that purpose.

The pulley E on the shaft C drives the shaft F, on which is the picking-cylinder F′, which takes the thrashed straw across the concave G and throws it upon the screen or bolt H. The picking-cylinder turns in the direction indicated by the arrow. Its teeth pass between the ribs on the perforated concave G, and about one-fourth inch from the concave. The concave G is perforated with holes about five-eighths of an inch in diameter and close together. It may be made of sheet metal.

The ribs $G^1$ are located just above the concave G, and about three inches apart, to hold the straw and stalks up off the concave as they pass over it, and to prevent them from dragging the bolls and seeds across the said perforated screen or concave, and permitting the latter to fall through upon the belt K′.

H is a bolt, made preferably of thin boards, bored with holes large enough to permit the heads to fall through. The front end is hung by eyes $G^2$ on rods $G^4$, and the rear end on the top bar, $H^1$, by links $H^2$. It is traversed or shaken by links I, attached to cranks I′ on the shaft J, which latter is driven by pulley $J^1$ by a belt from pulley $J^2$.

A roller on the shaft J, and another roller, K, under the concave G, carry an endless apron or belt, K′, to receive the bolls and seed as they drop through the bolt, and convey them to the hulling-concave D′, where the bolls or small pods are broken or stripped from the seed, which latter is delivered over the front of the concave onto the shoe L, where it is fanned and screened.

The shoe L is made preferably in the form shown, and hung by links L′. It is provided with one or more screens, M, of suitable-sized mesh—say, No. 12, or one hundred and forty-four openings per square inch. If two are used, the first may be No. 8. The screened seed is collected below, while the chaff and light matter are blown out by the fan through the opening M′.

The thrashing-teeth may have both their sides and ends roughened, if desired, to adapt them to more effectually hull the seed.

What I claim is—

1. The combination, with the thrashing-cylinder of a seed-separating machine, of appliances operating in connection with the teeth of the said thrashing-cylinder to detach clover-heads from their stems, and appliances operating in connection with the same cylinder to hull or detach the clover-seeds from the small pods containing them, whereby clover-heads may be thrashed or detached from their stems and the seeds hulled or separated from the pods in one operation with one and the same thrashing-cylinder, substantially as described.

2. In combination with the thrashing-cylinder of a seed-separating machine, appliances supported adjacent to the said thrashing-cylinder and projecting between its teeth, the teeth of the thrashing-cylinder adapted to have a relative motion across the said appliances, whereby by their joint action clover-heads may be thrashed or detached from their stems, and, in connection with and adjacent to the same cylinder, hulling appliances which are adapted to co-operate with the said cylinder and its teeth and effect the separation of the clover-seeds from the small pods containing them, substantially as described.

3. In combination with the thrashing-cylinder of a seed-separating machine, a surface provided with teeth, adapted, in connection with the thrashing-cylinder, to thrash or detach clover-heads from their stems, and another surface provided with hulling appliances adjacent to the same cylinder, and adapted, in connection therewith, to hull or detach clover-seeds from the small pods containing them, substantially as described, whereby in a single machine and with one and the same cylinder clover-heads may be thrashed or detached from their stems, and the seeds hulled from their pods, all at one operation and at one handling.

4. A rotating thrashing and hulling cylinder with a thrashing concave or arch above and a hulling concave or arch below, substantially as described, adapted to thrash the seeds from the straw and stalks and hull it at one operation with one and the same cylinder.

5. As a means for operating the bolt, the combination with it of a crank-shaft located at the rear of the machine, said crank-shaft at the same time caused to carry the apron K′, substantially as described.

6. The combination, with a thrashing-cylinder adapted to take in and operate upon clover on the straw, of thrashing and hulling devices located opposite said cylinder, and operating in connection therewith, whereby clover may be taken on the straw, the heads thrashed therefrom, and the seed hulled out all at one operation and with one cylinder, substantially as described.

JOHN C. BIRDSELL.

Witnesses:
WELLS W. LEGGETT,
F. O. MCCLEARY.